3,287,323
PROCESS FOR THE PRODUCTION OF A HIGHLY ORIENTABLE, CRYSTALLIZABLE, FILAMENT-FORMING POLYAMIDE
Stephanie Louise Kwolek, Wilmington, Del., and Paul Winthrop Morgan, West Chester, Pa., assignors to E. I. du Pont de Nemours and Company, Wilmington, Del., a corporation of Delaware
No Drawing. Filed Apr. 25, 1963, Ser. No. 275,506
1 Claim. (Cl. 260—78)

This invention relates to a novel class of crystalline, linear condensation polyamides and to a manufacturing process therefor.

Among the numerous combinations of bifunctional complementary reactants heretofore suggested for the manufacture of linear condensation polyamides, those of wholly aliphatic reactants, e.g. adipic acid and hexamethylene diamine which yield nylon 66, have been most frequently employed in commercial practice since crystalline products have been readily obtained. Such crystalline products have been particularly attractive since, in comparison with non-crystalline or amorphous forms, they possess higher softening points, distinct melting points, greater light stability and opacity as well as improved tenacity and elongation values.

Although the use of aromatic polyamide reactants is also known, i.e. to achieve other desired benefits, certain combinations which include such reactants have not previously produced suitable crystalline polymers. Illustrative of such combinations are those of meta-phenylene diamine and either adipic, suberic or sebacic acid, as described for example in Flory U.S. Patent 2,244,192. Rather than exhibiting the properties of crystalline polymers, the products of those materials are amber colored resinous materials which soften at temperatures considerably below their melting point.

In accordance with the present invention, a novel class of crystalline polyamides is provided by means of a unique series of critical processing steps. In contrast to prior art polyamides prepared to contain the same recurring units, the products of the invention exhibit the desirable features which are generally characteristic of crystalline polymers and in addition afford outstandingly higher modulus values. As a consequence of these properties, fabrics produced of the novel polymers in filament form exhibit improved fabric aesthetics.

More particularly the invention provides a linear polyamide selected from the group consisting of polymetaphenylene adipamide, polymetaphenylene suberamide, and polymetaphenylene sebacamide, said polyamide having an inherent viscosity of at least 0.8 and a crystallinity index above 50.

The novel crystalline polyamides of the invention consist of recurring structural units of the formula:

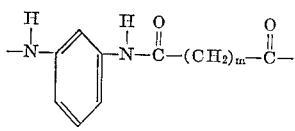

wherein $m$ is an even number integer from 4 through 8. In filament form, the polyamides have excellent light stability and improved tensile properties, particularly in terms of higher modulus and tenacity values.

The method of the invention involves the following series of critical steps to obtain a polyamide in a highly orientable, crystallizable form:

(1) Forming an anhydrous condensation mixture consisting of (a) a diacid chloride of an acid selected from the group consisting of adipic acid, suberic acid, and sebacic acid, together with (b) a stoichiometric equivalent, based on the said diacid chloride, of meta-phenylene diamine, and (c) an organic, acid accepting diluent which is a solvent for said diamine and said polyamide and which is present in such an amount to provide a final concentration of 5–35% by weight of polyamide therein, by addition of said diacid chloride to a solution of said diamine in said diluent while maintaining the said condensation mixture under continuous agitation in the absence of water at a temperature between —20 and 25° C., preferably 0–25° C., until completion of said addition, (2) Continuing said agitation at a temperature not above 30° C. until a polyamide is formed having an inherent viscosity of at least 0.8, and (3) Separating the polyamide thusly formed.

Strict adherence to the foregoing process variables is necessary to obtain the particular polyamides in such form that they be capable of crystallization to a crystallinity index of 50 or more. The reactants and diluent should be highly purified such that water and other extraneous materials are essentially excluded. The water content of the reaction mixture, in particular, should not exceed 0.02% by weight. For purposes of excluding moisture and other reactive vapors, the reaction should be conducted under an inert atmosphere such as nitrogen, dry air or the like. The stoichiometric equivalent of diacid chloride in undiluted form should be added to the diluent solution of diamine as rapidly as possible but without permitting the temperature to exceed 25° C. during the addition. For this purpose it is normally desirable to initially cool the diamine solution to a temperature between 0 and 10° C. Even after completion of the addition, the reaction mixture should not be heated above 30° C.

Following complete addition of the diacid chloride to the amine solution it is desirable to allow the reaction mixture to warm up to between 10° and 25° C. while continuing the agitation for at least 20 minutes. Subsequently the polycondensate can be precipitated by pouring the reaction mixture into water under conditions of agitation. The recovered, washed and dried polymer is then desirably dry spun from dimethylacetamide or dimethylsulfoxide to give fibers with excellent tenacity and elongation properties.

Suitable organic, acid accepting diluents in which to conduct the polymerization include alkyl substituted amides such as N-methylpyrrolidone, dimethylacetamide and hexamethyl phosphoramide.

The manner in which the prepared polyamides are crystallized is not a critical feature of the invention. Although steam setting of drawn fibers, as performed in the examples, is a preferred technique, others are also suitable. Typical among such other methods are those involving dry-heat setting, hot-wet treatment, or the use of hydroxyl-containing organic non-solvent swelling agents, such as described in U.S. Patents 2,307,846 and 2,289,377.

It is to be understood that once the polymers have been prepared in a highly purified crystallizable form, they can be suitably modified as by the inclusion of dyes, fillers, delusterants, anti-static agents and the like.

The crystalline polyamides can be employed in the form of filaments, sheets, rods, tubes, coatings and the like. In the form of filaments they are particularly useful in the fabrication of tire cords, carpets, wearing apparel, etc.

Examples I through III hereinafter illustrate the preparation of polyamides according to the process of the invention. Example IV illustrates the crystallization of those polyamides in the form of filaments. Example V demonstrates comparative properties of polymetaphenylene adipamide versus polyhexamethylene adipamide. In the examples, all parts are by weight unless otherwise stated.

Example I

In a 500 ml. round bottom flask equipped with a stirrer was placed 10.814 g. (0.1 mole) m-phenylenediamine and 75 ml. dimethylacetamide. The solution was cooled with ice to 10° C. From a pipette there was added rapidly 14.7 ml. (0.1 mole) of adipyl chloride. The flask was cooled continuously with ice and the contents vigorously stirred while the temperature of the reaction was maintained below 25° C. Following addition of the adipyl chloride, the viscous mixture was stirred for one hour without allowing the temperature to exceed 25° C. The polymer was precipitated by adding water, washed several times with water and once with an ethyl alcohol/water mixture (1/1 by volume). Polymetaphenylene adipamide having a polymer melting temperature of 344° C. and an inherent viscosity of 1.66 in m-cresol was produced in a yield of 100% of that theoretically obtainable.

Example II

In a 500 ml. round bottom flask equipped with a stirrer was placed 2.163 g. (0.020 mole) m-phenylene diamine and 18 ml. dimethylacetamide. The solution was cooled with ice to 10° C. and 4.22 g. (0.020 mole) suberyl chloride added rapidly from a pipette while cooling and stirring to maintain the temperature constantly below 25° C. The mixture was thereafter stirred for one additional hour at the same temperature. Finally the polymer was precipitated with water in a Waring Blendor and washed with water and an ethyl alcohol/water mixture (1/1 by volume). Polymetaphenylene suberamide, polymer melting temperature 302° C. and inherent viscosity of 1.42 in m-cresol, was obtained in 100% yield as a white granular material.

Example III

In a 500 ml. round bottom flask equipped with a stirrer was dissolved 2.163 g. (0.020 mole) m-phenylene diamine in 18 ml. dimethylacetamide. The solution was cooled to 10° C. and thereafter 4.27 ml. (0.020 mole) sebacyl chloride were added rapidly from a pipette. The cooling was continued and the temperature of the reaction maintained below 25° C. After stirring for 1 hour the polymer was precipitated with water in a Waring Blendor. It was washed with water and an ethyl alcohol/water mixture (1/1 by volume) several times. Granular, white polymetaphenylene sebacamide was obtained in 100% yield. Melting temperature of the polymer was 258° C. Inherent viscosity in m-cresol was 1.20.

Example IV

The polymetaphenylene adipamide, polymetaphenylene suberamide and polymetaphenylene sebacamide of Examples I to III, respectively, were dissolved in dimethyl acetamide to a 30% solution. The solution was dry spun into the form of a yarn by forcing the solution through a spinneret into a long chamber, kept at 190° C., to evaporate the solvent. The amorphous yarn with 0 crystallinity index was then drawn and collected on a metal bobbin. The yarn of polymetaphenylene adipamide had a $T/E/M_i$ (tenacity, elongation, initial modulus) of 5.4/31/75, the T/E value for polymetaphenylene suberamide was 1.27/117, and that for polymetaphenylene sebacamide was 1.95/198.

The metal bobbin with the fiber was then placed in a steam autoclave, the steam pressure regulator set to 50 p.s.i. and the fiber exposed to this pressure at a temperature of 147.6° C. for between 30 and 45 minutes. Upon release of the steam, the fibers were allowed to cool at room temperature. The crystallinity index of the treated fibers was as follows:

above 75 for polymetaphenylene adipamide,
between 50 and 60 for polymetaphenylene suberamide,
between 50 and 60 for polymetaphenylene sebacamide.

Example V

Highly crystalline yarn samples of the polymetaphenylene adipamide of Example I and commercial polyhexamethylene adipamide, respectively, were exposed to ultraviolet light irradiation for purposes of measuring the attendant degradation in terms of tenacity-elongation half-life. The results are significantly in favor of polymetaphenylene adipamide, which has a tenacity-elongation half-life of 450 hours as compared to polyhexamethylene adipamide which has a tenacity-elongation half-life of only 185 hours.

For the preparation of the polyamides in Examples I, II and III, extreme care was exercised to ensure that the condensation reactions proceeded in the absence of impurities which might have prevented the formation of crystallizable polymers. For this reason the dimethylacetamide employed was distilled from m-tolylene diisocyanate through a spinning band column under reduced pressure. The adipyl chloride was distilled through a Vigreux column under very low vacuum. Suberyl chloride was prepared from suberic acid and thionyl chloride and fractionally distilled under vacuum. Sebacyl chloride was purified by fractional distillation under reduced pressure. The reagents thus prepared and highly purified were absolutely dry. Only the solvent dimethylacetamide contained a trace of water and that never exceeded 0.02%. All condensations were performed under an atmosphere of dry nitrogen in order to exclude moisture.

All values of inherent viscosity in the specification and claim were calculated from the equation:

$$\text{Inherent viscosity} = \frac{\ln R}{C}$$

wherein R is the viscosity of a solution of 0.5 gram of the polymer in 100 milliliters of solvent at 30° C. divided by the viscosity of the solvent in the same units and at the same temperature, and C is the concentration of the polymer solution in grams of polymer per 100 milliliters of solution. For purposes of this invention, m-cresol is the solvent.

The polymer melting temperatures given in the examples are determined by passing a stick of solid polymer in sliding contact with a heated metal bar. The bar temperature at which a streak of molten polymer is initially formed is taken as the polymer melting temperature.

The values of crystallinity index referred to herein are measured according to the procedure of Wakelin, Virgin, and Crystal, Journal of Applied Physics, vol. 30, pages 1654–1662 (1959). According to this procedure the most crystalline soluble polymer sample obtainable is given a value of 100 and the least crystalline sample a value of zero. The index for the various fiber samples is thus a relative measure of crystallinity between these two known extremes. To obtain the zero index for the polymers disclosed herein the latter were spun into fibers which were wholly amorphous as determined by X-ray analysis. To obtain the 100 index a melt pressed film was allowed to soak in an aqueous 50% dimethylformamide solution for 10 minutes and then thermally annealed for six hours at 200° C.

Values of tenacity and elongation given in the examples are in units respectively of grams/denier and percent and are determined in the conventional manner. Initial modulus values are determined as described in U.S. Patent 2,956,330, column 7.

What is claimed is:

Method for the production of a highly orientable, crystallizable, filament-forming polyamide, said method comprising the steps of (1) forming an anhydrous condensation mixture consisting of (a) a diacid chloride of an acid selected from the group consisting of adipic acid, suberic acid and sebacic acid, together with (b) a stoichiometric equivalent, based on the said diacid chloride, of meta-phenylene diamine, and (c) an organic, acid accepting diluent selected from the group consisting of N-methylpyrrolidone, dimethylacetamide and hexamethylphosphoramide and which is present in such an amount to provide a final concentration of 5–35% by weight of polyamide therein, said mixture being formed by addition of said diacid chloride to a solution of said diamine in said diluent while maintaining the said condensation mixture under continuous agitation in the absence of oxygen at a temperature between −20 and 25° C. until completion of said addition, (2) continuing said agitation in the absence of water and at a temperature not above 30° C. until a polyamide is formed having an inherent viscosity of at least 0.8, as measured at 30° C. in m-cresol solvent at a concentration of 0.5 gram polymer per 100 ml. solvent, and (3) separating the polyamide thusly formed.

References Cited by the Examiner

UNITED STATES PATENTS

| | | | |
|---|---|---|---|
| 2,244,192 | 6/1941 | Flory | 260—78 |
| 2,336,384 | 12/1943 | Baker et al. | 260—78 |
| 2,352,725 | 7/1944 | Markwood | 260—78 |
| 2,831,834 | 4/1958 | Magat | 260—78 |
| 2,880,057 | 3/1959 | Cuculo | 260—78 |
| 3,063,966 | 11/1962 | Kwolek et al. | 260—78 |
| 3,143,528 | 8/1964 | Finestone et al. | 260—78 |

FOREIGN PATENTS 614,625  12/1948  Great Britain.

OTHER REFERENCES

Mark et al., Physical Chemistry of High Polymeric Systems, Interscience, N.Y., 1950, pp. 357–359, 363.

Tobalsky, Properties and Structure of Polymers, John Wiley and Sons, N.Y., 1960, p. 198.

WILLIAM H. SHORT, *Primary Examiner.*

H. D. ANDERSON, *Assistant Examiner.*